UNITED STATES PATENT OFFICE.

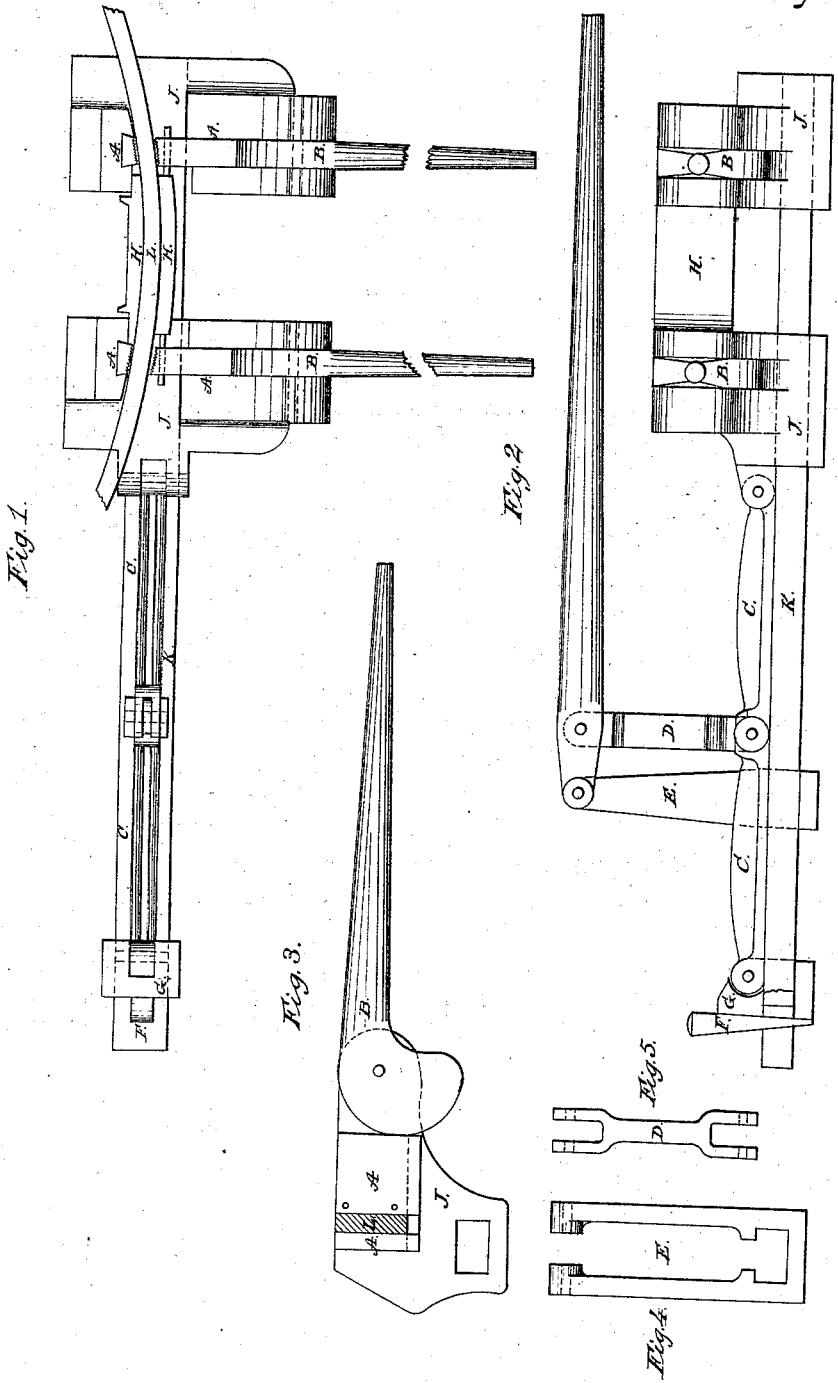

IRA D. CARD, OF DANVILLE, CALIFORNIA.

IMPROVEMENT IN MACHINES FOR UPSETTING TIRES.

Specification forming part of Letters Patent No. 39,629, dated August 25, 1863.

*To all whom it may concern:*

Be it known that I, IRA D. CARD, of Danville, in the county of Contra Costa and State of California, have invented a new and useful machine called the "Tire-Upsetter;" and I do hereby declare that the following is a full and exact description of the same.

Figure 1 in the drawings represents a top view of the machine divested of the lever. A A A A represent the jaws of the machine. B B represent the two cams, which move the adjustable portion of the jaws. L represents the tire placed in the jaws of the machine. J J are the two vise-heads. I I I I forms the groove in which the tire is placed for upsetting. K represents the foundation-beam, upon which the inner jaw slides, and which supports the toggle-joint and lever. C C represent the toggle-joint. G is the fulcrum-head of the toggle-joint, which bears against the movable wedge F.

In Fig. 5 D represents the connecting-rod between the toggle-joint and lever.

In Fig. 4 E represents the fulcrum upon which the lever works.

Fig. 2 represents a front view of the entire machine. I I, Fig. 2, represents the groove; B B, the cams; J J, the vise-heads; K, the foundation-beam. C C represent the toggle-joint and its bearings. D represents the connecting-rod; F, the fulcrum; G, the fulcrum-head bearing against the movable wedge F.

Fig. 3 represents a sectional view of the vise-head and its cam. B represents the cam. J is the vise-head. A A represent the vise-jaws. L represents the tire placed between the jaws. The tire, being heated, is placed in a horizontal position in the groove, as represented in Fig. 1, and by the action of the cam-lever B B the jaws are made to firmly clasp the tire, when, by the continuous working of the lever M, the fulcrum-head G, with the sliding jaw on the left, is forced against the stationary jaw upon the right, and the tire is thus upset. The amount to be upset, having been first ascertained, can be accurately arrived at by noticing the advance of the movable jaw along the scale marked upon the foundation-beam K between the two vise-heads.

What I claim as my invention, and desire to secure by Letters Patent, is—

1. The adjustable fulcrum head G, with the self-acting wedge F, constructed and operating as described.

2. Constructing the jaws I I I I of the walls of the groove, in the manner and for the purpose of operating substantially as described.

In witness whereof I, the said IRA D. CARD, have hereunto set my hand this 31st day of December, in the year of our Lord 1862.

IRA D. CARD.

Witnesses:
GEO. F. LEIGHTON,
W. B. EWER.